(12) United States Patent
Rowe

(10) Patent No.: US 7,826,542 B2
(45) Date of Patent: Nov. 2, 2010

(54) CHANNELIZATION FILTER COMMUNICATION SYSTEMS AND METHODS THEREFOR

(75) Inventor: David A. Rowe, Torrance, CA (US)

(73) Assignee: Semtech Corporation, Camarillo, CA (US)

( * ) Notice: Subject to any disclaimer, the term of this patent is extended or adjusted under 35 U.S.C. 154(b) by 933 days.

(21) Appl. No.: 11/644,949

(22) Filed: Dec. 26, 2006

(65) Prior Publication Data

US 2008/0152047 A1     Jun. 26, 2008

(51) Int. Cl.
H04K 1/10 (2006.01)
H04B 1/10 (2006.01)
(52) U.S. Cl. ........................ 375/260; 375/350
(58) Field of Classification Search .......... 375/229, 375/232, 259, 260, 350
See application file for complete search history.

(56) References Cited

U.S. PATENT DOCUMENTS 5,848,097 A * 12/1998 Carney et al. .......... 375/219
2004/0157646 A1 * 8/2004 Raleigh et al. .......... 455/562.1
2006/0072688 A1 * 4/2006 Liang et al. .......... 375/343
2006/0141973 A1 * 6/2006 Behrens et al. .......... 455/313
2006/0252399 A1 * 11/2006 Paulus .......... 455/302

\* cited by examiner

*Primary Examiner*—Don N Vo
(74) *Attorney, Agent, or Firm*—McDermott Will & Emery LLP

(57) ABSTRACT

A channelization filter communication system comprises: a channelization filtering system, a calibration unit, amplifiers, communication channel frequency converters and a baseband processor. The channelization filtering system includes a selector input configured to receive a communication channel filter selector signal and selectable communication channel filter elements. The selectable communication channel filter elements include one or more resistors formed of a first resistor type and one or more capacitors formed of a first capacitor type. The calibration unit includes a calibration signal generator configured to provide a calibration signal and a frequency measurement unit. The calibration signal generator includes one or more resistors formed of the same first resistor type and one or more capacitors formed of the same first capacitor type. The frequency measurement unit includes a first input configured to receive the calibration signal and an output configured to provide information representing the frequency of the calibration signal.

25 Claims, 6 Drawing Sheets

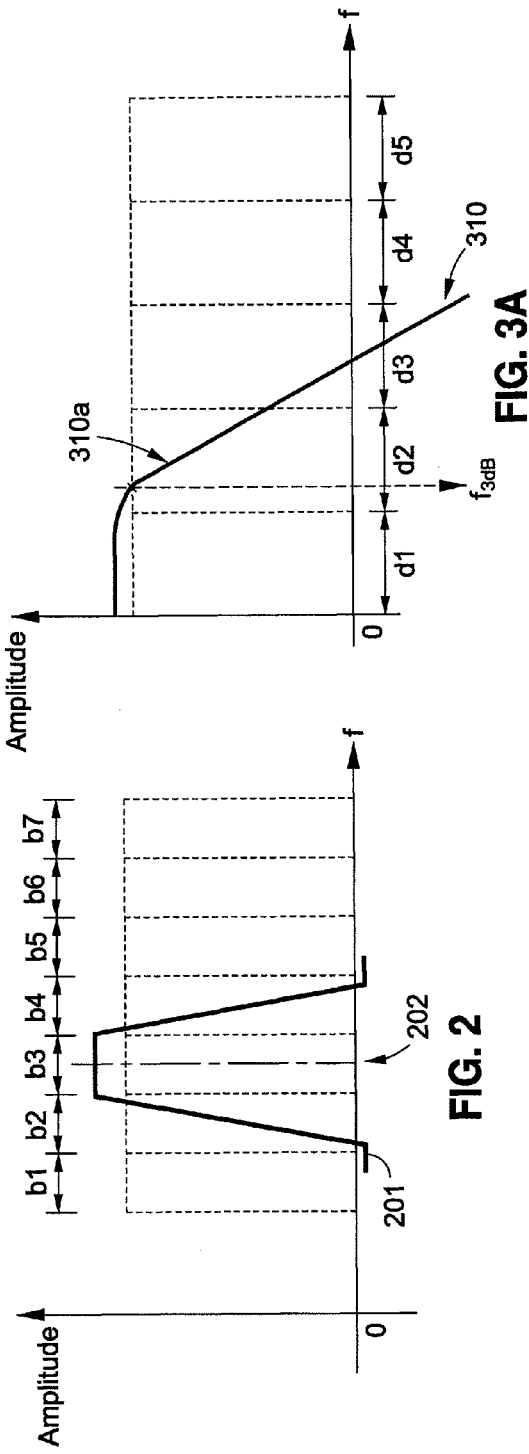
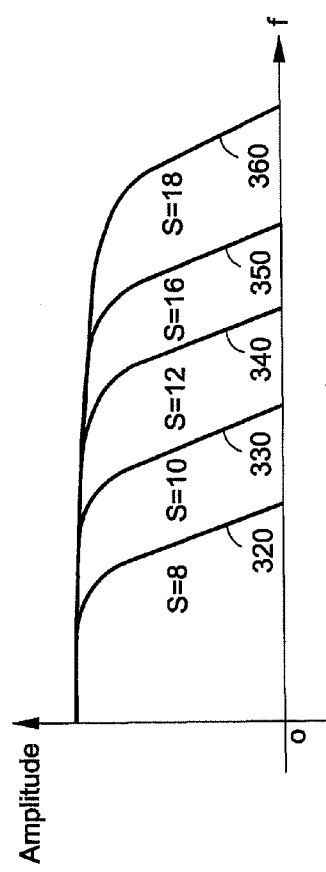
FIG. 3A
FIG. 2
FIG. 3B

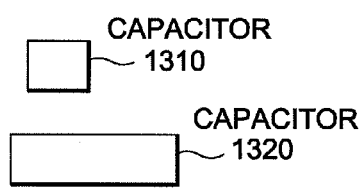
FIG. 13
| Band 1 | | Band 2 | |
|---|---|---|---|
| cal. osc. freq. | freq. select. value | cal. osc. freq. | freq. select. value |
| ⋮ | ⋮ | ⋮ | ⋮ |
| 410-430 | 2 | 400-410 | 3 |
| 431-450 | 3 | 410-440 | 4 |
| 450-480 | 4 | 440-470 | 5 |
| ⋮ | ⋮ | ⋮ | ⋮ |
| | | | |
| | | | |
FIG. 15
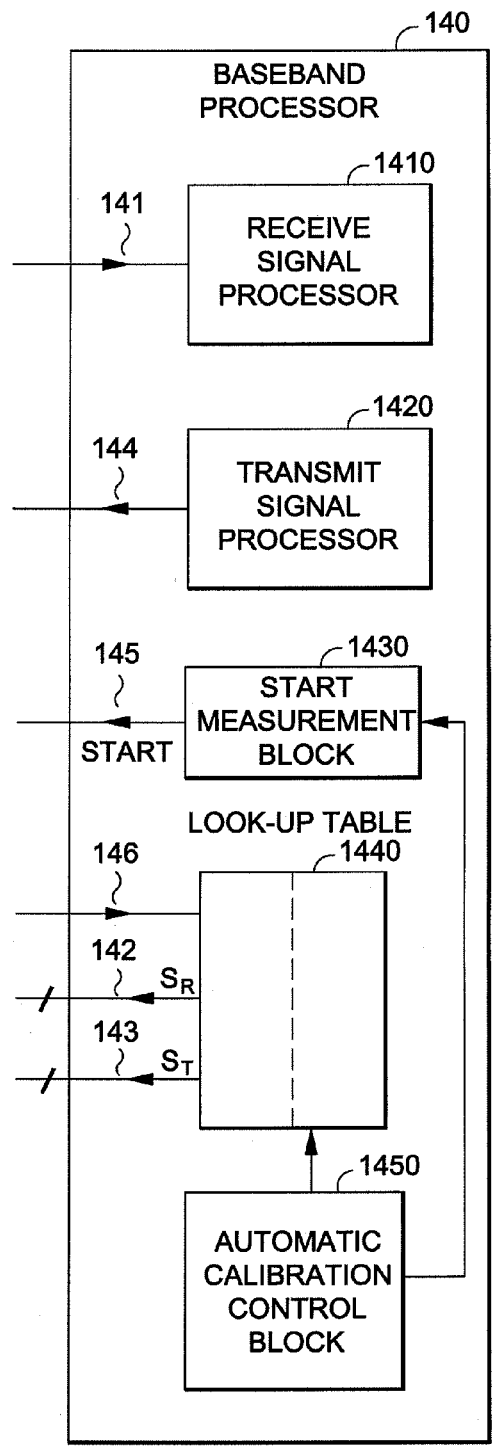
FIG. 14

CHANNELIZATION FILTER COMMUNICATION SYSTEMS AND METHODS THEREFOR

FIELD OF THE INVENTION

The present invention generally relates to filters, transceivers and communication systems, and more particularly, to channelization filtering systems, channelization filter selection methods, and transceivers and communication systems embodying the foregoing.

BACKGROUND OF THE INVENTION

Process variations in circuits (or device variations) impact the quality and yield of circuits such as filters. The parameters of semiconductor circuits can vary from lot to lot, wafer to wafer, die to die, or device to device. These variations can degrade the circuit performance and produce low circuit yield. The values of circuit components such as resistors may vary +/−20% of the target values, and the values of circuit components such as capacitors may also vary +/−20% of the target values. Furthermore, some resistors and capacitors may have values that deviate more than 20% from the target values.

SUMMARY OF THE INVENTION

The present invention provides apparatus and methods for calibrating and selecting device parameters to overcome the foregoing shortcomings and for providing flexible, highly-manufacturable, low-cost, high-performance communication systems.

According to one embodiment of the present invention, a channelization filter communication system comprises an amplifier configured to amplify a communication channel signal and a communication channel frequency converter coupled to the amplifier. The communication channel frequency converter includes a first input configured to receive a first communication channel signal, a second input configured to receive a reference signal, and an output configured to provide a second communication channel signal. The second communication channel signal comprises a frequency-translated version of the first communication channel signal.

The communication system further comprises a channelization filtering system coupled to the communication channel frequency converter. The channelization filtering system includes a selector input configured to receive a communication channel filter selector signal and selectable communication channel filter elements. One or more of the selectable communication channel filter elements are configured to be selected based on the communication channel filter selector signal to provide a target cutoff frequency. The selectable communication channel filter elements include one or more first circuits formed of a first process type.

The communication system further comprises a calibration unit, which includes a calibration signal generator configured to provide a calibration signal. The calibration signal generator includes one or more second circuits formed of the same first process type. The calibration unit further includes a calibration parameter evaluation unit coupled to the calibration signal generator. The calibration parameter evaluation unit includes a first input configured to receive the calibration signal and an output configured to provide information representing a parameter for characterizing the calibration signal.

According to one embodiment of the present invention, a channelization filter communication system comprises a channelization filtering system configured to receive a first communication channel signal. The channelization filtering system includes a selector input configured to receive a communication channel filter selector signal and selectable communication channel filter elements. One or more of the selectable communication channel filter elements are configured to be selected based on the communication channel filter selector signal to provide a target cutoff frequency. The selectable communication channel filter elements include one or more resistors formed of a first resistor type and one or more capacitors formed of a first capacitor type.

The communication system further comprises a calibration unit including a calibration signal generator configured to provide a calibration signal. The calibration signal generator includes one or more resistors formed of the same first resistor type and one or more capacitors formed of the same first capacitor type. The calibration unit further includes a frequency measurement unit coupled to the calibration signal generator. The frequency measurement unit includes a first input configured to receive the calibration signal and an output configured to provide information representing a frequency of the calibration signal.

According to one aspect of the present invention, a method is provided for providing filter selection and filtering a communication signal utilizing one or more components of a calibration unit including one or more resistors formed of a first resistor type and one or more capacitors formed of a first capacitor type and utilizing one or more components of a channelization filtering system including one or more resistors formed of the same first resistor type and one or more capacitors formed of the same first capacitor type.

The method comprises: generating a calibration oscillation signal using a calibration oscillator, the calibration oscillator including one or more resistors formed of a first resistor type and one or more capacitors formed of a first capacitor type; evaluating the calibration oscillation signal using a frequency measurement unit coupled to the calibration oscillator; determining a frequency of the calibration oscillation signal using the frequency measurement unit; and providing information representing the frequency of the calibration oscillation signal.

The method further comprises: determining a filter frequency selector value based on the information representing the frequency of the calibration oscillation signal; providing the filter frequency selector value to a channelization filtering system, the channelization filtering system including filter components, the filter components including one or more resistors formed of the same first resistor type and one or more capacitors formed of the same first capacitor type; selecting one or more of the filter components in the channelization filtering system based on the filter frequency selector value; receiving a communication signal by the channelization filtering system; and filtering the communication signal using the selected one or more of the filter components in the channelization filtering system.

According to one aspect of the present invention, a method is provided for providing filter selection and filtering a communication signal utilizing one or more components of a calibration unit including one or more first circuits formed of a first process type and utilizing one or more components of a channelization filtering system including one or more second circuits formed of the same first process type.

The method comprises: generating a calibration signal using a calibration signal generator, the calibration signal generator including one or more first circuits formed of a first process type; evaluating the calibration signal; determining a parameter for characterizing the calibration signal; and providing information representing the parameter of the calibration signal.

The method further comprises: determining a filter selector value for a target cutoff frequency based on the parameter of the calibration signal; providing the filter selector value to a channelization filtering system, the channelization filtering system including filter components, the filter components including one or more second circuits formed of the same first process type; selecting one or more of the filter components in the channelization filtering system for the target cutoff frequency based on the filter selector value; receiving a communication signal by the channelization filtering system; and filtering the communication signal using the selected one or more of the filter components in the channelization filtering system.

In one aspect of the disclosure, a communication system may further comprise: a transmit channel channelization filtering system configured to receive a first transmit channel signal, the transmit channelization filtering system including: a transmit channel selector input configured to receive a transmit channel filter selector signal; and selectable transmit channel filter elements, one or more of the selectable transmit channel filter elements configured to be selected based on the transmit channel filter selector signal to provide a target cutoff frequency, the selectable transmit channel filter elements including: one or more third circuits formed of the same first process type.

In one aspect, a communication system may further comprise: a transmit channel frequency converter coupled to the transmit channel channelization filtering system, the transmit channel frequency converter including: a first input configured to receive a second transmit channel signal; a second input configured to receive a reference signal; and an output configured to provide a third transmit channel signal, the third transmit channel signal comprising a frequency-translated version of the second transmit channel signal; and a transmit channel amplifier coupled to the transmit channel frequency converter, the transmit amplifier configured to provide an amplified transmit channel signal, wherein the amplifier is a receive channel amplifier, the communication channel frequency converter is a receive channel frequency converter, the channelization filtering system is a receive channel channelization filtering system, the communication channel signal is a receive channel signal, the first communication channel signal is a first receive channel signal, and the second communication channel signal is a second receive channel signal.

In one aspect of the disclosure, the selectable communication channel filter elements of the channelization filtering system may further include one or more third circuits formed of a second process type, and calibration signal generator includes one or more fourth circuits formed of the second process type.

In one aspect of the disclosure, the one or more first circuits formed of a first process type are one or more capacitors formed of a first capacitor type, the one or more second circuits formed of the same first process type are one or more capacitors formed of the same first capacitor type, the one or more third circuits formed of a second process type are one or more resistors formed of a first resistor type, and the one or more fourth circuits formed of the second process type are one or more resistors formed of the same first resistor type.

In one aspect of the disclosure, the values of the one or more first circuits are different from the values of the one or more second circuits.

In one aspect of the disclosure, a communication system may further comprise a filter selector control coupled to the calibration parameter evaluation unit, the filter selector control including: a first input configured to receive the parameter characterizing the calibration signal; and a first output configured to provide the communication channel filter selector signal based on the parameter.

In one aspect of the disclosure, the filter selector control may further include: a start evaluation unit configured to provide a start signal to the calibration parameter evaluation unit; a look-up table including data representing parameters of calibration signals and corresponding communication channel filter selector signals; and an automatic calibration control unit coupled to the start evaluation unit and the look-up table for controlling the start evaluation unit and the look-up table.

In one aspect of the disclosure, a communication system may further comprise: an analog-to-digital or digital-to-analog converter coupled to the channelization filtering system; and a baseband processor coupled to the analog-to-digital or digital-to-analog converter, the baseband processor configured to receive the parameter characterizing the calibration signal, configured to provide the communication channel filter selector signal, configured to provide a start signal to the calibration parameter evaluation unit, and configured to receive or provide a third communication channel signal.

In one aspect of the disclosure, the calibration signal generator is a calibration oscillator, the calibration signal is a calibration oscillation signal, the calibration parameter evaluation unit is a frequency measurement unit, the one or more first circuits formed of a first process type are one or more capacitors formed of a first capacitor type, the one or more second circuits formed of the same first process type are one or more capacitors formed of the same first capacitor type, and the parameter characterizing the calibration signal is a frequency of the calibration oscillation signal.

In one aspect of the disclosure, the values of the one or more resistors of the selectable communication channel filter elements are different from the values of the one or more resistors of the calibration signal generator, and the values of the one or more capacitors of the selectable communication channel filter elements are different from the values of the one or more capacitors of the calibration signal generator.

In one aspect of the disclosure, the first resistor type is an ion-implanted resistor or resistors, and the first capacitor type is a metal-insulator-metal capacitor or capacitors.

In one aspect of the disclosure, a communication system may further comprise: a second channelization filtering system configured to receive a second communication channel signal, the second channelization filtering system including: a second selector input configured to receive a second communication channel filter selector signal; and second selectable communication channel filter elements, one or more of the second selectable communication channel filter elements configured to be selected based on the second communication channel filter selector signal to provide a target cutoff frequency, the second selectable communication channel filter elements including: one or more resistors formed of the first resistor type; and one or more capacitors formed of the first capacitor type.

In one aspect of the disclosure, a communication system may further comprise a filter selector control coupled to the calibration unit, the filter selector control including: a first input configured to receive a frequency of the calibration signal; and a first output configured to provide the communication channel filter selector signal and the second communication channel filter selector signal.

In one aspect of the disclosure, the filter selector control further includes: a start measurement unit configured to provide a start signal to the frequency measurement unit; a look-up table including data representing frequencies or time constants of calibration signals and corresponding communication channel filter selector signals; and an automatic calibration control unit coupled to the start measurement unit and the look-up table for controlling the start measurement unit and the look-up table.

In one aspect of the disclosure, the calibration signal generator is an oscillator, and the calibration signal is an oscillation signal.

In one aspect of the disclosure, a method may further comprise: generating a plurality of calibration oscillation signals from a plurality of devices; evaluating the plurality of calibration oscillation signals; determining frequencies of the plurality of calibration oscillation signals; generating a filter selection control including information representing the frequencies of the plurality of calibration oscillation signals and information representing corresponding filter frequency selector values or including information representing a relationship between the frequencies of the plurality of calibration oscillation signals and the filter frequency selector values; and storing the filter selection control.

In one aspect of the disclosure, the step of determining the filter frequency selector value includes a step of utilizing the filter selection control.

In one aspect of the disclosure, the filter selection control is a look-up table.

In one aspect of the disclosure, the step of generating a calibration oscillation signal occurs at a start-up of a device, wherein the device includes the calibration oscillator and the channelization filtering system.

In one aspect of the disclosure, the step of generating a calibration oscillation signal occurs when a temperature of a device including the calibration oscillator and the channelization filtering system is increased above a threshold value.

In one aspect of the disclosure, the step of generating a calibration oscillation signal occurs when a user-defined event occurs.

In one aspect of the disclosure, a method may further comprise: generating a plurality of calibration signals from a plurality of devices; evaluating the plurality of calibration signals; determining parameters of the plurality of calibration signals; generating a filter selection control including information representing the parameters of the plurality of calibration signals and information representing corresponding filter selector values or including information representing a relationship between the parameters of the plurality of calibration signals and the filter selector values; and storing the filter selection control.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention.

FIG. 2 illustrates a communication signal superimposed over multiple frequency channels in accordance with one aspect of the present invention.

FIG. 3A illustrates a filter response curve superimposed over multiple frequency channels in accordance with one aspect of the present invention.

FIG. 3B illustrates filter response curves having different cutoff frequencies in accordance with one aspect of the present invention.

Figure 10B:
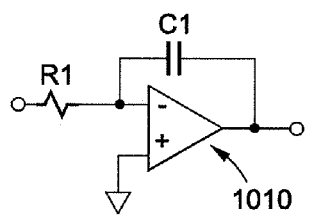
Figure 10A:
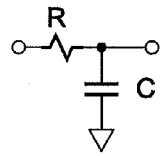
Figure 10C:
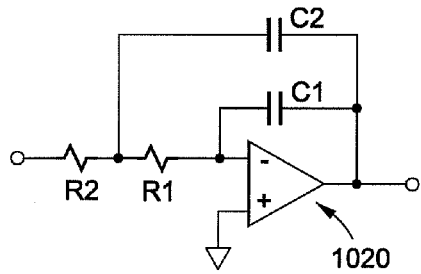

Each of FIGS. 10A, 10B and 10C illustrates a block diagram of a filter section in accordance with one embodiment of the present invention.

Figure 11:
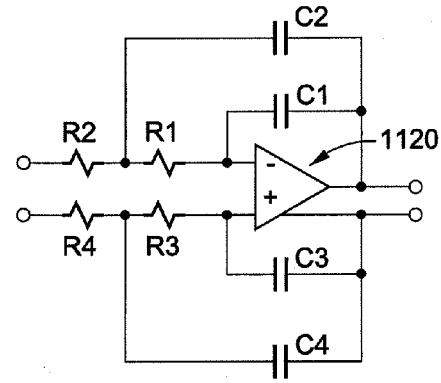

FIG. 11 is a block diagram of a filter section in accordance with another embodiment of the present invention.

Figure 12:
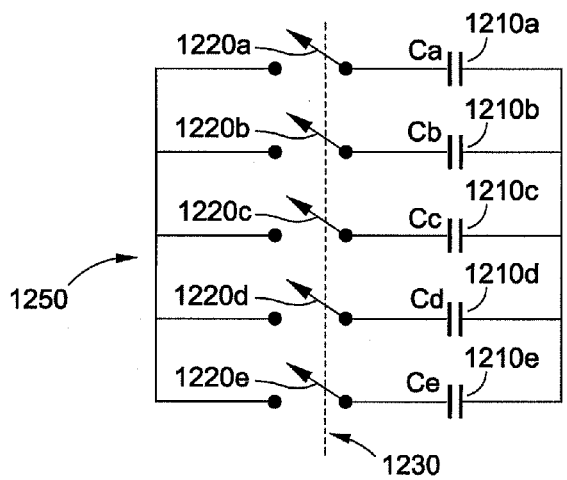

FIG. 12 is a block diagram of a capacitor block in accordance with one embodiment of the present invention.

FIG. 13 illustrates how capacitors having different values are formed in accordance with one aspect of the present invention.

FIG. 14 is a block diagram of a baseband processor in accordance with one embodiment of the present invention.

FIG. 15 illustrates a look-up table employed in a baseband processor in accordance with one embodiment of the present invention.

Figure 16:
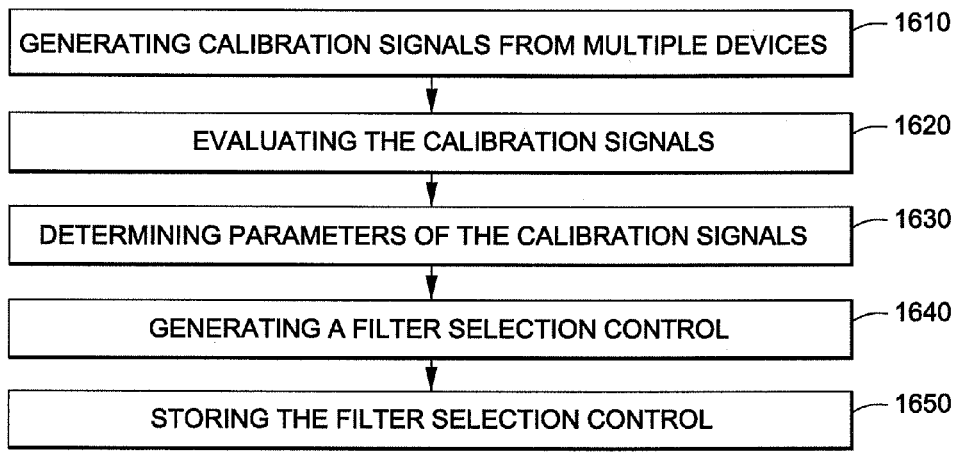

FIG. 16 illustrates a flow diagram for generating and storing a filter selection control in accordance with one aspect of the present invention.

Figure 17:
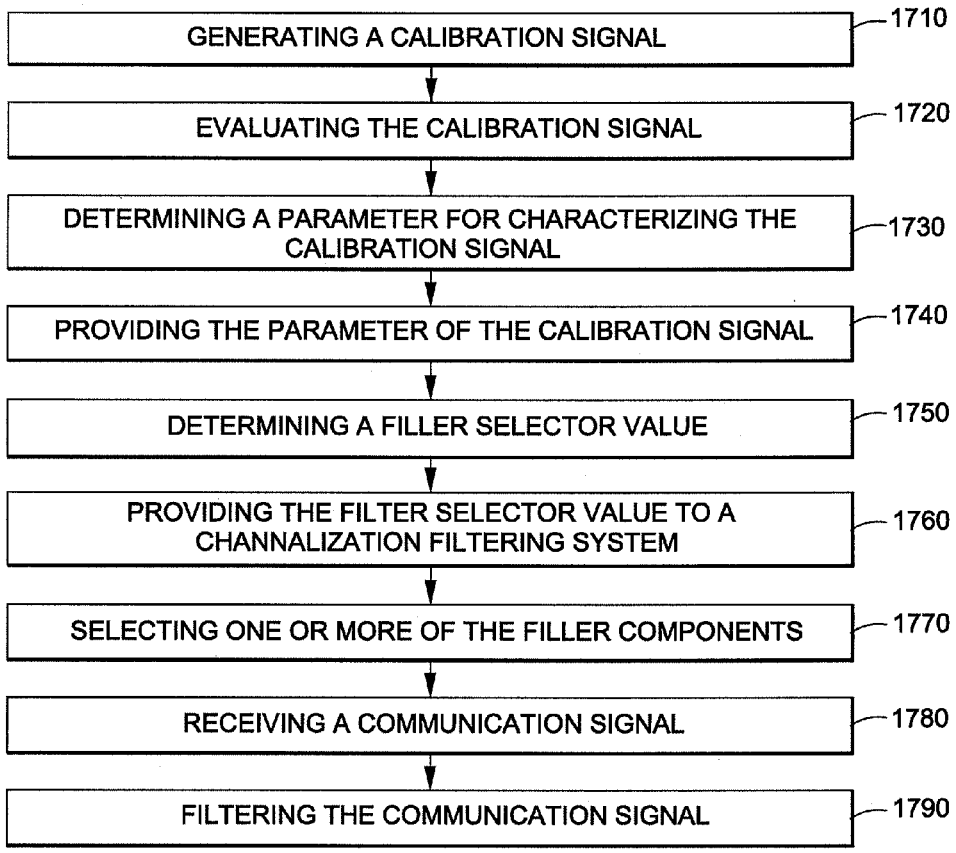

FIG. 17 illustrates a flow diagram for filtering a communication signal in accordance with one aspect of the present invention.

DETAILED DESCRIPTION OF THE INVENTION

In the following detailed description, numerous specific details are set forth to provide a full understanding of the present invention. It will be obvious, however, to one ordinarily skilled in the art that the present invention may be practiced without some of these specific details. In other instances, well-known structures and techniques have not been shown in detail not to obscure the present invention.

Figure 1:
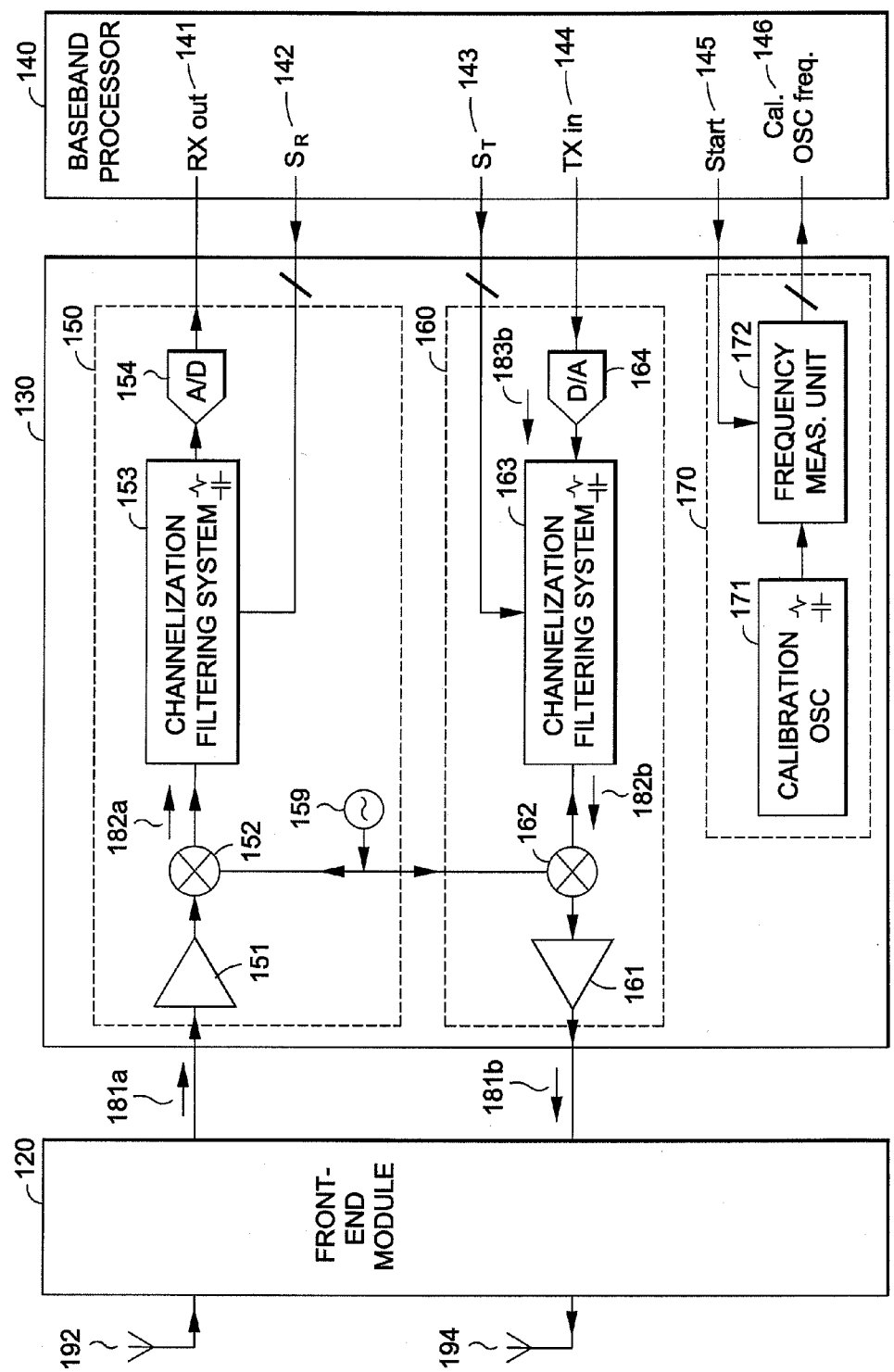
FIG. 1 is a block diagram of a communication system in accordance with one embodiment of the present invention.

FIG. 1 shows a block diagram of a communication system in accordance with one embodiment of the present invention. A communication system 110 includes antennas 192 and 194, a front-end module 120, a transceiver 130 and a digital baseband processor 140. The communication system 110 may be utilized in various wireless applications, including without limitation, WiMAX, GSM and WiFi. In another embodiment, a communication system may be wire lined or optical. For example, instead of having antennas 192 and 194, the transceiver 130 may be coupled to other wired communication systems or optical transmitters, receivers or fibers. In another embodiment, the front-end module 120, the baseband processor 140, and/or certain components of the front-end module 120 or the baseband processor 140 are incorporated into the transceiver 130. All these variations are within the scope of the present invention.

The front-end module 120 may include various radio frequency (RF) processors and amplifiers. The transceiver 130 includes a receiver 150, a transmitter 160 and a calibration unit 170.

The receiver 150 includes receive channel components 151, 152 and 159, a channelization filtering system 153 and an analog-to-digital converter (A/D converter) 154. The receive channel components 151, 152 and 159 are operable to condition a receive signal 181a to the frequency and magnitude desired before processing by the channelization filtering system 153. The A/D converter 154 produces a receive (RX) output signal 141 to the baseband processor 140. The baseband 140 provides a digital filter frequency selector signal $S_R$ 142 to the channelization filtering system 153 so that filter(s) or filter components in the channelization filtering system 153 for producing the desired (or target) cutoff frequency can be automatically and digitally selected and used to filter the receive signal 182a. A filter frequency selector signal can be a plurality of digital bits (e.g., 5 bits allows selecting 32 different cutoff frequencies).

In FIG. 1, the receive channel components include a low noise amplifier 151, a mixer 152, and a shared frequency source 159. The low noise amplifier 151 is operable to amplify the receive signal 181a with minimum additional noise (typically less than 1.5 dB). The amplified signal and a reference signal from the frequency source 159 are supplied to the mixer 152, which produces in response a frequency translated version (182a) of the receive signal (181a). The frequency source 159 may be a fixed or a variable frequency source, as known in the art. The frequency converted receive signal 182a is supplied to the channelization filtering system 153 for filtering.

The term "mixer" as used herein is a functional description, and the actual implementation may comprise a single, balanced, doubly balanced mixer, or other frequency converter circuits such as image rejection (or single sideband) mixers known in the art. Further, the frequency translation may be an upconversion or a downconversion, including a direct (or zero IF) upconversion or a direct (or zero IF) downconversion, depending upon the desired frequency input to the channelization filtering system, image rejection requirements, and other transceiver operational requirements.

In another embodiment, a buffer amplifier may be coupled between the mixer 152 and the channelization filtering system 153. A buffer amplifier provides additional amplification as well as an improved impedance matching and isolation at the channelization filtering system interface.

Still referring to FIG. 1, the transmitter 160 includes transmit channel components including a mixer 162 and an amplifier 161, a channelization filtering system 160 and a digital-to-analog converter (D/A converter) 164. The baseband processor 140 provides a transmit (TX) input signal 144 to the D/A converter 164 and a filter frequency selector signal $S_T$ 143 to the channelization filtering system 160. The filter frequency selector signal $S_T$ 143 allows the channelization filtering system 160 to select the appropriate filters or filter components to filter the TX input signal 144. Using the filter frequency selector signal $S_T$ 143, filter(s) or filter components in the channelization filtering system 163 for producing the desired (or target) cutoff frequency can be automatically and digitally selected and used to filter the transmit signal 183b.

In the particular embodiment, the frequency source 159 is shared between the receive and transmit channels for component reduction and cost savings. Alternatively, a separate frequency source can be used to supply the reference signal to the mixer 162. The mixer 162 and the frequency source 159 operate to frequency translate the transmit signal 182b from the channelization filtering system 163 to a carrier frequency.

The amplifier 161 may be a power amplifier or an intermediate amplifier coupled to a power amplifier in the front-end module 120. As a power amplifier, the amplifier 161 amplifies the magnitude of the carrier frequency signal to the transmission power, and the resulting carrier signal 181b is produced.

Still referring to FIG. 1, the calibration unit 170 includes a calibration oscillator 171 and a digital frequency measurement unit 172. The calibration oscillator 171 produces a calibration oscillation signal, and the frequency measurement unit 172 detects and measures the frequency of the calibration oscillation signal. The frequency measurement unit 172 then outputs the calibration oscillation frequency 146 (in digital form) to the baseband processor 140. Alternatively, the frequency measurement unit 172 may output other parameters characterizing the calibration oscillation signal or its frequency (e.g., $\tau$ (a time constant) described further later). These parameters are suitable for characterizing the process deviations in the calibration oscillator and the channelization filtering system. The baseband processor 140 provides a start measurement control signal 145 to the frequency measurement unit 172.

Now referring to FIGS. 1 and 2, in communication systems, various signal channels having certain bandwidths (such as b1, b2, b3, b4, b5, b6 and b7 as shown in FIG. 2) exist. For example, if the receive signal 182a of FIG. 1 (shown as a signal 201 in FIG. 2) is for a WiMAX (IEEE 802.16) application, the center frequency 202 for channel b3 is about 2.5 GHz (or 2.3-2.7 GHz) in the United States and 3.5 GHz (or 3.3-3.8 GHz) or 5 GHz in some other countries. The bandwidth may be, for example, between 1 to 14 MHz (e.g., 3.5, 5, 7, 8.75, 10 or 14 MHz). These particular frequencies and bandwidth numbers are provided for illustration purposes, and the present invention is not limited to these frequencies or bandwidths.

In accordance with one embodiment of the present invention, the channelization filtering system 153 of FIG. 1 filters signals so that only the signals within the assigned channel (e.g., channel b3 in the example shown in FIG. 2) are retrieved and all other channel signals are eliminated before the signals reach the A/D converter 154 of FIG. 1.

FIG. 3 shows a desired channel (denoted as d1) with a first adjacent channel d2, a next adjacent channel d3, and other adjacent channels d4 and d5. Each of the channels d1, d2, d3, d4 and d5 of FIG. 3 corresponds to one half (in bandwidth) of b3, b4, b5, b6 and b7 of FIG. 2. The channelization filtering system 153 of FIG. 1 provides a filter response curve 310 having a cutoff frequency or 3 dB frequency ($f_{3dB}$). It is desirable to have a steep drop-off slope at 310a. When the channelization filtering systems 153 and 163 include resistors R's and capacitors C's, these R's and C's govern $f_{3dB}$. The equation for $f_{3dB}$ can be expressed as: $f_{3dB}=\alpha*S/R*C$ (equation 1), where $\alpha$ is a constant determined by the design of filters in the channelization filtering systems 153 and 163, and S is a filter frequency selection number.

The above equation can be rewritten as follows:

$f_{3dB}=\alpha*S/\tau$ (equation 2), where $\tau=R*C$;

$S=k*\tau*f_{3dB}$ (equation 3), where $k=1/\alpha$, $f_{3dB}$ is the desired (or target) cutoff frequency or the desired (or target) 3 dB frequency, and S is the filter frequency selector signal. The channelization filtering systems 153 and 163 may be initially designed to produce the desired or target $f_{3dB}$ using S=16, but due to process variations, the actual R*C or the actual or measured $\tau$ may be different from the designed values of $\tau$, and thus S=16 may not be adequate to provide the desired $f_{3dB}$. By measuring the actual $\tau$ (representing the actual device parameters reflecting the device variations), the value of S needed to compensate for the deviation in $\tau$ can be determined from the above equation using k, measured $\tau$, and the desired $f_{3dB}$. In this example, even though the designed value of S is 16, the value of S selected may be a different number (e.g., 13) to compensate for the deviation in $\tau$.

The actual or measured $\tau$ (expressed as $\tau_j'$ in this paragraph) may be different from a desired $\tau$ (expressed as $\tau_j$ in this paragraph) for various reasons including process variations (or process error $E_p$). This can be expressed as: $\tau_j'=\tau_j*(1+E_{p\tau})$; or $1+E_{p\tau}=\tau_j'/\tau_j$. For a resistor, this can be expressed as $R_j'=R_j*(1+E_{pR})$, where $R_j'$ is the actual R value, $R_j$ is the desired R value, and $E_{pR}$ is the process error in R. For a capacitor, this can be expressed as $C_j'=C_j*(1+E_{pC})$, where $C_j'$ is the actual C value, $C_j$ is the desired C value, and $E_{pC}$ is the process error in C. As described more fully below, the actual $\tau$ can be determined, for example, by measuring the frequency of the calibration oscillator. Based on the measured $\tau$, the appropriate value of S can be determined based on equation 3 above.

FIG. 3B shows various filter response curves 320, 330, 340, 350, and 360 for filters having different cutoff frequencies in accordance with one aspect of the present invention. Each of these curves has a different value of S. The cutoff frequency of a filter varies with the value of S. In other words, by selecting the appropriate value of S, a filter (or filter components) with the appropriate cutoff frequency can be selected.

Referring back to FIG. 1, according to one embodiment, the calibration oscillator 171 include a circuit or circuits that determine the frequency of the oscillator 171, the channelization filtering system 153 includes a circuit or circuits that determine the cutoff frequency (or $f_{3dB}$) of its filter(s), and the channelization filtering system 163 includes a circuit or circuits that determine the cutoff frequency (or $f_{3dB}$) of its filter (s). The aforementioned circuits of the calibration oscillator 171 and the channelization filtering systems 153 and 163 are formed using the same process types. However, the values of these circuits may be the same or may vary. The term "circuit" includes a component or components.

According to one embodiment of the present invention, all of the calibration oscillator 171 and the channelization filtering systems 153 and 163 include resistors of one process type (e.g., ion-implanted resistors or metal resistors) and capacitors of one process type (e.g., metal-insulator-metal capacitors). It should be noted that the invention is not limited to ion-implanted resistors, metal resistors and metal-insulator-metal capacitors and can be practiced with many other process types. The values of the resistors and capacitors in the calibration oscillator 171 and the channelization filtering systems 153 and 163 may be the same or different.

For example, the calibration oscillator 171 may include resistors having values R1 and R2 and capacitors having values C1 and C2, and each of the channelization filtering systems 153 and 163 may include resistors having values that are k*R1 and h*R2 and capacitors having values m*C1 and n*C2, where k, h, m and n is any number (e.g., a fraction or a whole number). For instance, as shown in FIG. 13, if the calibration oscillator 171 includes a capacitor 1310, the channelization filtering system 153 or 163 may include a capacitor 1320, which is made from the same process type but is different in size to produce a different capacitor value.

The values of the components in the channelization filtering system 153 may be the same as or different from the values of the components in the channelization filtering system 163. Furthermore, the channelization filtering system 153 may have a structure and components that are the same or different from the structure and components of the channelization filtering system 163. According to one embodiment, the structure and components of the channelization filtering system 153 are substantially similar to the structure and components of the channelization filtering system 163, but not identical because one system is for a receive channel and the other system is for a transmit channel.

In FIG. 1, a notation ("/") on a signal line indicates that the signal line includes multiple lines or multiple bits. A signal line indicated to have multiple lines in FIG. 1 may have only one signal line in alternate embodiments, and a line indicated to have a single line in FIG. 1 may have multiple signal lines in alternate embodiments.

Figure 4:
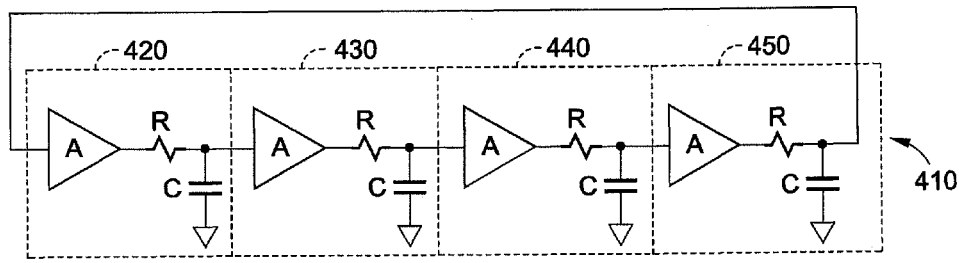
FIG. 4 is a block diagram of a calibration oscillator in accordance with one embodiment of the present invention.
Figure 5:
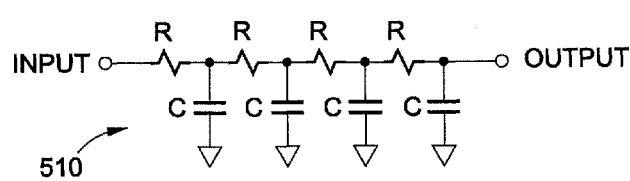
FIG. 5 is a block diagram of a calibration oscillator in accordance with another embodiment of the present invention.
Figure 6:
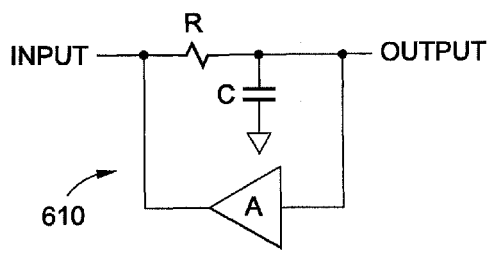
FIG. 6 is a block diagram of a calibration oscillator in accordance with yet another embodiment of the present invention.

FIGS. 4-6 show several different implementations of a calibration oscillator in accordance with various embodiments of the present invention. In FIG. 4, a calibration oscillator 410 includes multiple stages 420, 430, 440 and 450 coupled in series, each stage including an amplifier A coupled to a resistor R and capacitor C circuit. The last stage 450 is fed back to the first stage 420. All of the R's are made from the same resistor process type, and all of the C's are made from the same capacitor process type. The values of R's are the same, and the values of C's are the same. Alternatively, the values of R's and the values of C's may be different. The amplifiers A's may include bipolar transistors or CMOS devices. While four stages are shown in this example, in alternate embodiments, a calibration oscillator may have more or less number of stages (e.g., two, three, five, eight, ten stages, etc.). Alternatively, a calibration oscillator may be formed using one device or one transistor.

The calibration oscillation frequency ($f_{osc}$) of the calibration oscillator 410 mainly depends on R and C and has the following relationship: $f_{osc}=\beta/\tau$, where $\tau$ (time constant) is a function of R and C ($\tau=R*C$), and $\beta$ is a constant. From this equation, $\tau=\beta/f_{osc}$. $\tau$ can be determined by measuring $f_{osc}$.

In FIG. 5, a calibration oscillator 510 includes multiple stages, each having an R-C circuit. In FIG. 6, a calibration oscillator 610 includes an R-C circuit coupled to an amplifier A in parallel. In FIG. 5, $\tau$ can be determined by measuring the amplitude difference between the output signal and the input signal. In FIG. 5, $\tau$ can be determined by measuring the time delay between the output signal and the input signal. In alternative embodiments, $\tau$ can be determined in many other ways.

Figure 8:
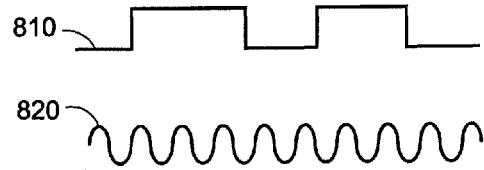
FIG. 8 illustrates an output signal of a calibration oscillator and an output signal of a reference oscillator in accordance with one aspect of the present invention.
Figure 7:
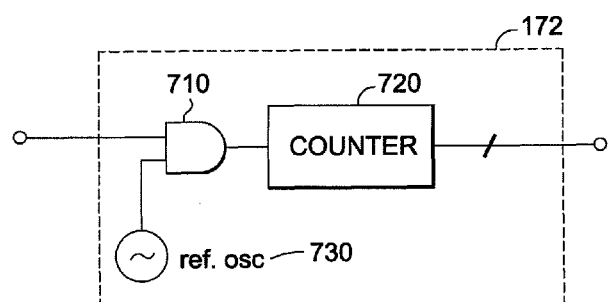
FIG. 7 is a block diagram of a frequency measurement unit in accordance with one embodiment of the present invention.

FIG. 7 is a block diagram of a frequency measurement unit in accordance with one embodiment of the present invention. A frequency measurement unit 172 includes an adder 710, a reference oscillator 730 and a counter 720. The adder 710 receives a calibration oscillation signal 810 shown in FIG. 8 from the calibration oscillator 171 of FIG. 1 and a reference signal 820 shown in FIG. 8 from the reference oscillator 730. In this example, the signal period of the reference signal 820 is shorter than the signal period of the calibration oscillation signal 810. The counter 720 can count the number of times the calibration oscillation signal 810 is high or low to determine the frequency of the calibration oscillation signal 810. The counter 720 provides the calibration oscillation frequency 146 to the baseband processor 140 in FIG. 1.

Figure 9:
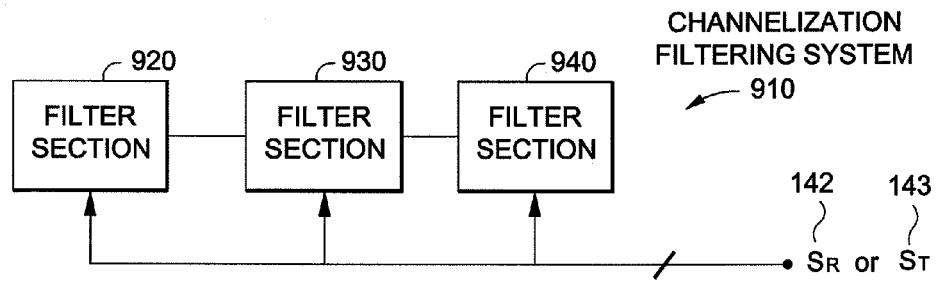
FIG. 9 is a block diagram of a channelization filtering system in accordance with one embodiment of the present invention.

FIG. 9 is a block diagram of a channelization filtering system in accordance with one embodiment of the present invention. A channelization filtering system 910 is a 5-pole filter including a passive 1-pole filter section 920, a 2-pole filter section 930 and a 2-pole filter section 940. Each of the sections 920, 930 and 940 receives a filter frequency selector signal such as $S_R$ 142 or $S_T$ 143. The channelization filtering system 910 may be utilized in a receiver or a transmitter. The passive 1-pole filter section 920 may be formed using an R-C circuit such as the R-C circuit shown in FIG. 10A. FIGS. 10B, 10C and 11 show exemplary components of a filter section. FIG. 10B shows an active filter where an R-C circuit is coupled to an operational amplifier (Op Amp) 1010. FIG. 10C shows another active filter including two R-C circuits (R1-C1 and R2-C2) coupled to an operational amplifier 1020. FIG. 11 shows an active differential filter having four R-C circuits (R1-C1, R2-C2, R3-C3 and R4-C4) coupled to an operational amplifier 1120. A channelization filtering system may be implemented in a variety of ways.

FIG. 12 is a block diagram of a capacitor block in accordance with one embodiment of the present invention. FIG. 12 illustrates one implementation of selecting an appropriate filter(s) by selecting the appropriate one or more switches and thus one or more capacitors. In this example, resistors are not selectable. A capacitor block 1250 can represent any of C, C1, C2, C3 or C4 in FIGS. 10A, 10B, 10C and 11.

In FIG. 12, the capacitor block 1250 includes multiple capacitor units, each unit including a switch and a capacitor. For example, the first unit includes a switch 1220a and a capacitor Ca 1210a, the second unit includes a switch 1220b and a capacitor Cb 1210b, a third unit includes a switch 1220c and a capacitor Cc 1210c, a fourth unit includes a switch 1220d and a capacitor Cd 1210d, and a fifth unit includes a switch 1220e and a capacitor Ce 1210e. A filter frequency selector signal 1230 is applied to each of the switches to select the appropriate capacitor.

In this example, the capacitor Ca 1210a may be 1 pF, the capacitor Cb 1210b may be 2 pF (2*Ca), the capacitor Cc 1210c may be 4 pF (4*Ca), the capacitor Cd 1210d may be 8 pF (8*Ca), the capacitor Ce 1210e may be 16 pF (16*Ca). These capacitors are of one process type (e.g., metal-insulator-metal capacitors). The switches may be made of FET switches. 32 different capacitors with corresponding switches may be provided to select 32 different cutoff frequencies. Depending on the value of the filter frequency selector signal 1230, one or more switches are selected. When the selected switches close the circuit, the corresponding capacitors are selected and are used to filter the signals (transmit or receive signals).

In an alternate embodiment, resistors (rather than capacitors) are provided with switches so that appropriate resistors are selected to provide the target cutoff frequency. In yet another embodiment, a combination of resistors having switches and capacitors having switches can be used.

While FIGS. 1, 4-6, 10A, 10B, 10C, 11 and 12 show exemplary implementations utilizing resistors and capacitors, the present invention is not limited to these embodiments.

FIG. 14 is a block diagram of a baseband processor in accordance with one embodiment of the present invention. The baseband processor 140 includes a receive signal processor 1410, a transmit signal processor 1420, a start measurement block 1430, a look-up table 1440, and an automatic calibration control block 1450. The receive signal processor 1410 receives the receive output signal 141 and processes it. The transmit signal processor 1420 processes a transmit signal and produces the transmit input signal 144.

The automatic calibration control block 1450 controls the start measurement block 1430 so that the block 1430 sends a start measurement signal to the frequency measurement unit 172 automatically, for example, at start-up, when the device temperatures increase above a pre-defined threshold value or when a user-defined event occurs. Upon receipt of the start measurement signal, the frequency measurement unit 172 automatically measures the calibration oscillation frequency and provides the measured calibration oscillation frequency or frequencies to the baseband processor.

The automatic calibration control block 1450 also controls the look-up table 1440. According to one aspect of the present invention, the look-up table 1440 is created in the following manner. After transceivers are fabricated, multiple transceivers (e.g., transceivers from different process lots, different wafers and different dies) are selected for evaluation. A frequency measurement unit of each of these selected transceivers measures the calibration oscillation frequency of the calibration oscillators. Filter frequency selector values can then be determined for these measured calibration oscillation frequencies. FIG. 15 shows an exemplary look-up table for two bands (e.g., 2.5 GHz band and 5 GHz and) in accordance with one aspect of the present invention. For each band, the look-up table includes a column for measured calibration oscillation frequencies and a column for the corresponding filter frequency selector values. Once the look-up table is created, it is stored in a baseband processor of each of the transceivers evaluated and other transceivers fabricated. In alternate embodiments, a look-up table may contain different information (e.g., measured $\tau$'s instead of or in addition to the measured calibration oscillation frequencies or other parameters).

Referring to FIGS. 1 and 14, according to one aspect of the present invention, when the transceiver 130 of FIG. 1 is used, its frequency measurement unit 172 measures the calibration oscillation frequency of the calibration oscillator 171 and provides the frequency to the look-up table 1440 of the baseband processor 140 in FIG. 14. The look-up table 1440 then provides the filter frequency selector signal $S_R$ 142 to the channelization filtering system 153 of the receiver 150 in FIG. 1 and the filter frequency selector signal $S_T$ 143 to the channelization filtering system 163 of the transmitter 160 in FIG. 1.

For each of the channelization filtering systems 153 and 163, depending on the value of the filter frequency selector signal, filter(s) (or capacitors and/or resistors) that provide the appropriate cutoff frequency are automatically selected and used to filter the receive or transmit signals.

While a look-up table is one way to produce filter frequency selector signals based on the measured calibration oscillation frequencies, the present invention is not limited to the embodiments shown above and can be practiced in other ways.

FIG. 16 illustrates a flow diagram for generating and storing a filter selection control in accordance with one aspect of the present invention. Step 1610 includes generating multiple calibration signals from multiple devices (e.g., multiple transceivers, multiple transmitters or multiple receivers from different lots, different wafers and/or different dies). These calibration signals are generated by the calibration signal generators of these devices. These calibration signals can be calibration oscillation signals. The calibration signal generators can be oscillators. One of these oscillators may be the calibration oscillator 171 in FIG. 1.

Step 1620 includes evaluating the calibration signals (e.g., calibration oscillation signals). According to one aspect of the present invention, this step can be performed by the calibration parameter evaluation units of the devices (e.g., frequency measurement units). One of the frequency measurement units may be the frequency measurement unit 172 in FIG. 1. In an alternate embodiment, this step can be performed by one or more off-chip calibration parameter evaluation units (i.e., they are on a device(s) that does not contain the calibration signal generators).

Step 1630 includes determining the parameters of the calibration signals (e.g., the frequencies ($f_{osc}$'s) or $\tau$'s of the calibration oscillation signals or the actual parameters of the calibration signal generators reflecting device variations such as the measured RC's of the calibration signal generators). According to one aspect of the present invention, this step can be performed by the calibration parameter evaluation units of the devices (e.g., frequency measurement units) or an off-chip calibration parameter evaluation unit(s).

Step 1640 includes generating a filter selection control (e.g., a look-up table) based on the measured parameters of the calibration signals and the target values (e.g., based on the measured calibration oscillation frequencies and the target cutoff frequencies). The filter selection control may include information representing the actual parameters of the calibration signals (e.g., the frequencies ($f_{osc}$'s) or $\tau$'s of the calibration oscillation signals or the actual parameters of the calibration signal generators reflecting device variations such as the measured RC's of the calibration signal generators or other information) and information representing corresponding filter selector values (e.g., filter frequency selector values). Alternatively, it may include information representing a relationship between the parameters of the calibration signals and filter selector values. The filter selection control may include the above information for one or more frequency bands.

Step 1650 includes storing the filter selection control. The filter selection control may be stored in transceivers, transmitters, receivers, baseband processors or other separate units that are associated with the transceivers, transmitters, receivers or the baseband processors. According to one exemplary embodiment, the filter selection control is stored in each of the transceivers evaluated as described above and other transceivers to be shipped to customers. Baseband functionalities may be incorporated into the transceivers. According to another exemplary embodiment, a look-up table is stored in each of the baseband processors to be shipped to customers. According to yet another exemplary embodiment, a look-up table is stored in separates units that are associated with the transceivers, transmitters, receivers or the baseband processors.

Each of the steps 1610-1650 can be performed one device at a time or all of the devices at once simultaneously.

FIG. 17 illustrates a flow diagram for filtering a communication signal in accordance with one aspect of the present invention. According to one aspect, the steps described with reference to FIG. 17 occur when a communication system of the present invention is utilized by a user.

Step 1710 includes generating a calibration signal using an on-chip calibration signal generator. The calibration signal generator includes one or more first circuits formed of a first process type. According to one aspect of the present invention, the calibration signal is a calibration oscillation signal, and the calibration signal generator is an on-chip oscillator (e.g., a calibration oscillator like the unit 171 in FIG. 1). According to one embodiment, the oscillator includes one or more resistors formed of a first resistor type and one or more capacitors formed of a first capacitor type.

Step 1720 includes evaluating the calibration signal using a calibration parameter evaluation unit (e.g., an on-chip frequency measurement unit like the unit 172 in FIG. 1). For example, an integrated circuit (IC) chip containing a transceiver, a receiver and/or a transmitter includes the oscillator and the frequency measurement unit, and the calibration oscillation frequency of the oscillator is measured by the frequency measurement unit.

Step 1730 includes determining a parameter for characterizing the calibration signal (e.g., the frequency ($f_{osc}$) or $\tau$ of the calibration oscillation signal or the actual parameters of the calibration signal generator reflecting device variations such as the measured RC's of the calibration signal generator) using the calibration parameter evaluation unit (e.g., the frequency measurement unit). The parameter is suitable for characterizing the process deviation of the components in the calibration signal generator as well as the process deviation of the components in the channelization filtering system because these components are of the same process type.

Step 1740 includes providing information representing the parameter of the calibration signal (e.g., the frequency ($f_{osc}$) or $\tau$ of the calibration oscillation signal or the actual parameters of the calibration signal generator reflecting device variations such as the measured RC's of the calibration signal generator or other information). This information can be provided to a component of a transceiver, a transmitter, a receiver, a baseband processor or another device that may contain the stored filter selection control. According to one aspect of the present invention, $f_{osc}$, $\tau$, information derived from or related to $f_{osc}$, information derived from or related to the actual RC's of the calibration signal generator or other data can be information representing the frequency of the calibration oscillation signal.

Step 1750 includes determining a filter selector value (e.g., filter frequency selector value) for a target cutoff frequency of a channelization filtering system based on the measured parameter of the calibration signal. This can be performed, for example, utilizing the stored filter selection control (e.g., look-up table).

Step 1760 includes providing the filter selector value (e.g., filter frequency selector value) to the channelization filtering system. The channelization filtering system, which is onboard the same IC chip containing the calibration signal generator, includes filter components, and the filter components include one or more second circuits formed of the same first process type. According to one embodiment of the present invention, the filter components include one or more resistors formed of the first resistor type and one or more capacitors formed of the same first capacitor type.

Step 1770 includes selecting one or more of the filter components in the channelization filtering system for the target cutoff frequency based on the filter selector value.

Step 1780 includes receiving a communication signal (e.g., a transmit channel signal or a receive channel signal) by the channelization filtering system. Step 1790 includes filtering the communication signal using the selected one or more of the filter components in the channelization filtering system.

It should be noted that the particular frequencies, bandwidths and other numbers noted above are exemplary, and the present invention is not limited to these particular frequencies, bandwidths and numbers.

While the various circuits are grouped into particular blocks (e.g., a transceiver, a transmitter, a receiver, a calibration unit, a channelization filtering system, a baseband processor or a front-end module) in accordance with one embodiment for illustration purposes, the invention is not limited to these exemplary groupings. Other groupings of circuit components are considered to be within the scope of the invention, and the claims of the invention cover these different embodiments.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. All structural and functional equivalents to the elements of the various embodiments described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A channelization filter communication system comprising:
    an amplifier configured to amplify a communication channel signal;
    a communication channel frequency converter coupled to the amplifier, the communication channel frequency converter including:
        a first input configured to receive a first communication channel signal;
        a second input configured to receive a reference signal; and
        an output configured to provide a second communication channel signal, the second communication channel signal comprising a frequency-translated version of the first communication channel signal;
    a channelization filtering system coupled to the communication channel frequency converter, the channelization filtering system including:
        a selector input configured to receive a communication channel filter selector signal; and
        selectable communication channel filter elements, one or more of the selectable communication channel filter elements configured to be selected based on the communication channel filter selector signal to provide a target cutoff frequency, the selectable communication channel filter elements including:
            one or more first circuits formed of a first process type; and
    a calibration unit including:
        a calibration signal generator configured to provide a calibration signal, the calibration signal generator including:
            one or more second circuits formed of the same first process type; and
        a calibration parameter evaluation unit coupled to the calibration signal generator, the calibration parameter evaluation unit including:
            a first input configured to receive the calibration signal; and
            an output configured to provide information representing a parameter for characterizing the calibration signal.

2. The communication system of claim 1 further comprising:
    a transmit channel channelization filtering system configured to receive a first transmit channel signal, the transmit channelization filtering system including:
        a transmit channel selector input configured to receive a transmit channel filter selector signal; and
        selectable transmit channel filter elements, one or more of the selectable transmit channel filter elements configured to be selected based on the transmit channel filter selector signal to provide a target cutoff frequency, the selectable transmit channel filter elements including:
            one or more third circuits formed of the same first process type; and
    a transmit channel frequency converter coupled to the transmit channelization filtering system, the transmit channel frequency converter including:
        a first input configured to receive a second transmit channel signal;
        a second input configured to receive a reference signal; and
        an output configured to provide a third transmit channel signal, the third transmit channel signal comprising a frequency-translated version of the second transmit channel signal; and
    a transmit channel amplifier coupled to the transmit channel frequency converter, the transmit amplifier configured to provide an amplified transmit channel signal,
    wherein the amplifier is a receive channel amplifier, the communication channel frequency converter is a receive channel frequency converter, the channelization filtering system is a receive channel channelization filtering system, the communication channel signal is a receive channel signal, the first communication channel signal is a first receive channel signal, and the second communication channel signal is a second receive channel signal.

3. The communication system of claim 1, wherein the selectable communication channel filter elements of the channelization filtering system further includes one or more third circuits formed of a second process type, and calibration signal generator includes one or more fourth circuits formed of the second process type.

4. The communication system of claim 3, wherein the one or more first circuits formed of a first process type are one or more capacitors formed of a first capacitor type,
    the one or more second circuits formed of the same first process type are one or more capacitors formed of the same first capacitor type,
    the one or more third circuits formed of a second process type are one or more resistors formed of a first resistor type, and
    the one or more fourth circuits formed of the second process type are one or more resistors formed of the same first resistor type.

5. The communication system of claim 1, wherein the values of the one or more first circuits are different from the values of the one or more second circuits.

6. The communication system of claim 1 further comprising a filter selector control coupled to the calibration parameter evaluation unit, the filter selector control including:
    a first input configured to receive the parameter characterizing the calibration signal; and
    a first output configured to provide the communication channel filter selector signal based on the parameter.

7. The communication system of claim 6, wherein the filter selector control further includes:
    a start evaluation unit configured to provide a start signal to the calibration parameter evaluation unit;
    a look-up table including data representing parameters of calibration signals and corresponding communication channel filter selector signals; and an automatic calibration control unit coupled to the start evaluation unit and the look-up table for controlling the start evaluation unit and the look-up table.

8. The communication system of claim 1 further comprising:
an analog-to-digital or digital-to-analog converter coupled to the channelization filtering system; and
a baseband processor coupled to the analog-to-digital or digital-to-analog converter, the baseband processor configured to receive the parameter characterizing the calibration signal, configured to provide the communication channel filter selector signal, configured to provide a start signal to the calibration parameter evaluation unit, and configured to receive or provide a third communication channel signal.

9. The communication system of claim 1, wherein the calibration signal generator is a calibration oscillator,
the calibration signal is a calibration oscillation signal,
the calibration parameter evaluation unit is a frequency measurement unit,
the one or more first circuits formed of a first process type are one or more capacitors formed of a first capacitor type,
the one or more second circuits formed of the same first process type are one or more capacitors formed of the same first capacitor type, and
the parameter characterizing the calibration signal is a frequency of the calibration oscillation signal.

10. A channelization filter communication system comprising:
a channelization filtering system configured to receive a first communication channel signal, the channelization filtering system including:
a selector input configured to receive a communication channel filter selector signal; and
selectable communication channel filter elements, one or more of the selectable communication channel filter elements configured to be selected based on the communication channel filter selector signal to provide a target cutoff frequency, the selectable communication channel filter elements including:
one or more resistors formed of a first resistor type; and
one or more capacitors formed of a first capacitor type; and
a calibration unit including:
a calibration signal generator configured to provide a calibration signal, the calibration signal generator including:
one or more resistors formed of the same first resistor type; and
one or more capacitors formed of the same first capacitor type; and
a frequency measurement unit coupled to the calibration signal generator, the frequency measurement unit including:
a first input configured to receive the calibration signal; and
an output configured to provide information representing a frequency of the calibration signal.

11. The communication system of claim 10, wherein the values of the one or more resistors of the selectable communication channel filter elements are different from the values of the one or more resistors of the calibration signal generator, and
the values of the one or more capacitors of the selectable communication channel filter elements are different from the values of the one or more capacitors of the calibration signal generator.

12. The communication system of claim 10, wherein the first resistor type is an ion-implanted resistor or resistors, and the first capacitor type is a metal-insulator-metal capacitor or capacitors.

13. The communication system of claim 10 further comprising:
a second channelization filtering system configured to receive a second communication channel signal, the second channelization filtering system including:
a second selector input configured to receive a second communication channel filter selector signal; and
second selectable communication channel filter elements, one or more of the second selectable communication channel filter elements configured to be selected based on the second communication channel filter selector signal to provide a target cutoff frequency, the second selectable communication channel filter elements including:
one or more resistors formed of the first resistor type; and
one or more capacitors formed of the first capacitor type.

14. The communication system of claim 13 further comprising a filter selector control coupled to the calibration unit, the filter selector control including:
a first input configured to receive a frequency of the calibration signal; and
a first output configured to provide the communication channel filter selector signal and the second communication channel filter selector signal.

15. The communication system of claim 14, wherein the filter selector control further includes:
a start measurement unit configured to provide a start signal to the frequency measurement unit;
a look-up table including data representing frequencies or time constants of calibration signals and corresponding communication channel filter selector signals; and
an automatic calibration control unit coupled to the start measurement unit and the look-up table for controlling the start measurement unit and the look-up table.

16. The communication system of claim 10, wherein the calibration signal generator is an oscillator, and the calibration signal is an oscillation signal.

17. A method for providing filter selection and filtering a communication signal utilizing one or more components of a calibration unit including one or more resistors formed of a first resistor type and one or more capacitors formed of a first capacitor type and utilizing one or more components of a channelization filtering system including one or more resistors formed of the same first resistor type and one or more capacitors formed of the same first capacitor type, the method comprising:
generating a calibration oscillation signal using a calibration oscillator, the calibration oscillator including one or more resistors formed of a first resistor type and one or more capacitors formed of a first capacitor type;
evaluating the calibration oscillation signal using a frequency measurement unit coupled to the calibration oscillator;
determining a frequency of the calibration oscillation signal using the frequency measurement unit;
providing information representing the frequency of the calibration oscillation signal;

determining a filter frequency selector value based on the information representing the frequency of the calibration oscillation signal;

providing the filter frequency selector value to a channelization filtering system, the channelization filtering system including filter components, the filter components including one or more resistors formed of the same first resistor type and one or more capacitors formed of the same first capacitor type;

selecting one or more of the filter components in the channelization filtering system based on the filter frequency selector value;

receiving a communication signal by the channelization filtering system; and filtering the communication signal using the selected one or more of the filter components in the channelization filtering system.

18. The method of claim 17 further comprising:

generating a plurality of calibration oscillation signals from a plurality of devices;

evaluating the plurality of calibration oscillation signals;

determining frequencies of the plurality of calibration oscillation signals;

generating a filter selection control including information representing the frequencies of the plurality of calibration oscillation signals and information representing corresponding filter frequency selector values or including information representing a relationship between the frequencies of the plurality of calibration oscillation signals and the filter frequency selector values; and storing the filter selection control.

19. The method of claim 18, wherein the step of determining the filter frequency selector value includes a step of utilizing the filter selection control.

20. The method of claim 18, wherein the filter selection control is a look-up table.

21. The method of claim 17, wherein the step of generating a calibration oscillation signal occurs at a start-up of a device, wherein the device includes the calibration oscillator and the channelization filtering system.

22. The method of claim 17, wherein the step of generating a calibration oscillation signal occurs when a temperature of a device including the calibration oscillator and the channelization filtering system is increased above a threshold value.

23. The method of claim 17, wherein the step of generating a calibration oscillation signal occurs when a user-defined event occurs.

24. A method for providing filter selection and filtering a communication signal utilizing one or more components of a calibration unit including one or more first circuits formed of a first process type and utilizing one or more components of a channelization filtering system including one or more second circuits formed of the same first process type, the method comprising:

generating a calibration signal using a calibration signal generator, the calibration signal generator including one or more first circuits formed of a first process type;

evaluating the calibration signal;

determining a parameter for characterizing the calibration signal;

providing information representing the parameter of the calibration signal;

determining a filter selector value for a target cutoff frequency based on the parameter of the calibration signal;

providing the filter selector value to a channelization filtering system, the channelization filtering system including filter components, the filter components including one or more second circuits formed of the same first process type;

selecting one or more of the filter components in the channelization filtering system for the target cutoff frequency based on the filter selector value;

receiving a communication signal by the channelization filtering system; and filtering the communication signal using the selected one or more of the filter components in the channelization filtering system.

25. The method of claim 24 further comprising:

generating a plurality of calibration signals from a plurality of devices;

evaluating the plurality of calibration signals;

determining parameters of the plurality of calibration signals;

generating a filter selection control including information representing the parameters of the plurality of calibration signals and information representing corresponding filter selector values or including information representing a relationship between the parameters of the plurality of calibration signals and the filter selector values; and storing the filter selection control.

* * * * *

UNITED STATES PATENT AND TRADEMARK OFFICE
CERTIFICATE OF CORRECTION

PATENT NO. : 7,826,542 B2
APPLICATION NO. : 11/644949
DATED : November 2, 2010
INVENTOR(S) : David A. Rowe It is certified that error appears in the above-identified patent and that said Letters Patent is hereby corrected as shown below:

IN THE SPECIFICATION:

In Column 9, Lines 10-11: Replace $\tau^{j}{}' = \tau_j * (1 + E_{p\tau})$", with -- $\tau_j{}' = \tau_j * (1 + E_{p\tau})$--.

Signed and Sealed this
Twenty-third Day of August, 2011

David J. Kappos
*Director of the United States Patent and Trademark Office*